US006154268A

United States Patent [19]

Itojima et al.

[11] Patent Number: 6,154,268

[45] **Date of Patent: *Nov. 28, 2000**

[54] PHOTO-PROCESSING APPARATUS

[75] Inventors: Mituhiko Itojima; Sinji Azuma, both of Wakayama-ken, Japan

[73] Assignee: Noritsu Koki Co., Ltd., Wakayama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,370

[22] Filed: Jan. 6, 1998

[30] Foreign Application Priority Data

Jan. 6, 1997 [JP] Japan .................................... 9-000195

[51] Int. Cl.[7] ........................... G03B 27/32; G03B 27/58; B65H 39/10

[52] U.S. Cl. ............................... 355/27; 355/72; 271/296

[58] Field of Search ................................ 355/27, 28, 29, 355/72, 77; 271/296, 288, 297

[56] References Cited

U.S. PATENT DOCUMENTS

| | | | |
|---|---|---|---|
| 4,977,437 | 12/1990 | Asai et al. | 355/27 |
| 5,006,882 | 4/1991 | Horikiri | 355/27 |
| 5,625,856 | 4/1997 | Kohda et al. | 355/27 |
| 5,712,699 | 1/1998 | Tamai | 355/72 |
| 5,774,204 | 6/1998 | Suzuki et al. | 355/27 |
| 5,790,237 | 8/1998 | Nomura et al. | 355/27 |
| 5,801,813 | 9/1998 | Morimoto et al. | 355/27 |
| 5,865,434 | 2/1999 | Yamanaka | 271/296 |

FOREIGN PATENT DOCUMENTS

| | | |
|---|---|---|
| 0 697 627 A1 | 2/1996 | European Pat. Off. . |
| WO 95/35253 | 12/1995 | WIPO . |

*Primary Examiner*—Russell Adams
*Assistant Examiner*—Peter B. Kim
*Attorney, Agent, or Firm*—Smith Patent Office

[57] ABSTRACT

A photo-processing apparatus having an exposing section and a developing section is disclosed. In this photo-processing apparatus a predetermined treatment of the photo-sensitive material is executed by conveying it along a conveying path through the exposing section and then through the developing section. A pair of rollers for nipping the photo-sensitive material and a drive unit for conveying the pair of rollers with the nipped photo-sensitive material along a conveying path are installed in the apparatus.

20 Claims, 13 Drawing Sheets

FIG. 4a
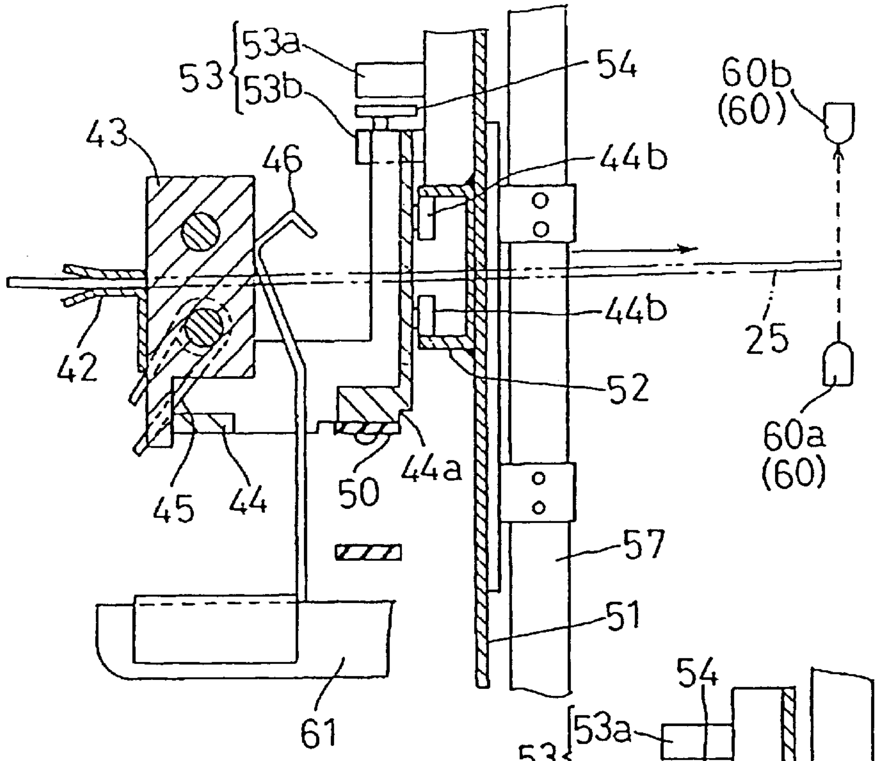
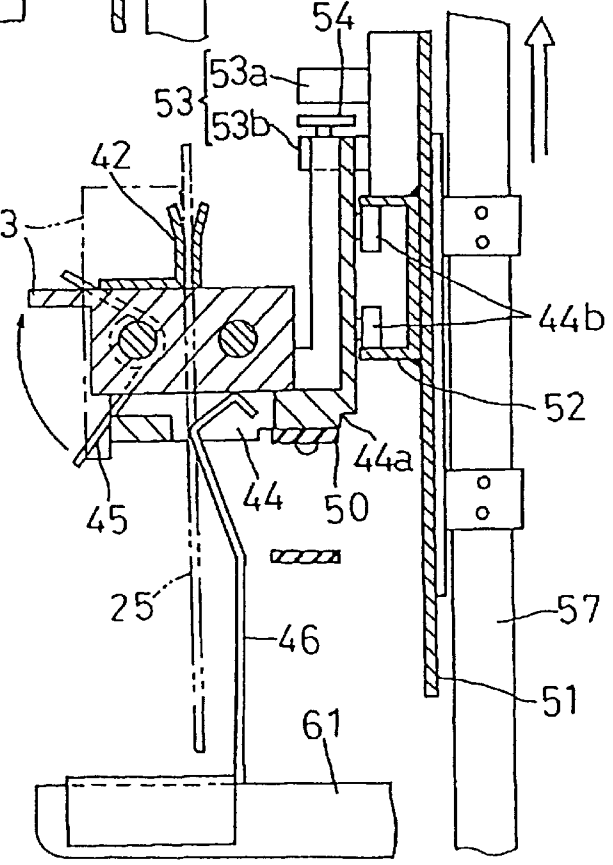
FIG. 4b

PHOTO-PROCESSING APPARATUS

BACKGROUND OF THE INVENTION

1. Field of the Invention

The present invention relates to a photographic processing apparatus for executing a predetermined treatment of a photo sensitive material by conveying it through two processing sections, for example, from an exposing section to a developing section.

2. Discussion of the Related Art

The related art will be described with reference to FIGS. 12 and 13. FIG. 12 is an enlarged cross sectional view of an exposing section and a part of a developing section of a photographic processing apparatus. In the exposing section 30, a roll of photo-sensitive material 25 is fed by a feed roller and cut into lengths corresponding to each frame by a cutter 1 and then the photo-sensitive material is sent onto the exposing table 2. The exposing table 2 is provided with an endless adsorptive belt 3 which circulates along a triangular path composed of three rollers disposed at each vertex. The photo-sensitive material 25 is sent to a predetermined position by the movement of the belt 3 in a direction shown by an arrow in FIG. 12. The adsorptive belt 3 is provided with a plurality of small apertures and the photo-sensitive material 25 is adsorbed to the adsorptive belt 3 by providing a vacuum to the underside of the belt 3. The photo-sensitive material 25 sent to the predetermined position on the exposing table 2 is then exposed and printed with an image on a film 26 held in a negative-mask 6 using a light from a light source 4 projected through a mirror tunnel 5, the negative-mask 6 and a lens unit 7. After being exposed and printed, the photo-sensitive material 25 is sent to the next stage of the developing section 32 by a conveying device 31.

The conveying device 31 is composed of a plurality of roller pairs and although not shown each end of each roller is engaged with and driven by an endless belt. The conveying device 31 is equipped with a conveying distributor unit 10 and a parallel conveying path unit 20.

FIG. 13 is a cross sectional view taken along the line A—A FIG. 12. The conveying distributor unit 10 comprises a movable path unit 13 which can move traversely along a rail 12 on a base table 11 at right angles to the direction that the photo-sensitive material 25 is being fed. The movable path unit 13 comprises a movable frame 14 which is equipped with a plurality of roller pairs 15. The movable path unit 13 is engaged and slidable with the rail 12 through a guide 12*a* fixed to the bottom surface of the movable frame 14.

The parallel conveyor path unit 20 comprises two conveyor paths 20A and 20B installed in parallel. Each conveyor path has a number of roller pairs 22 on a base table 21 respectively. Although not shown, each roller pair is rotationally driven by an endless belt which is driven by a motor that moves the photo-sensitive material 25. A driving unit is installed independently on each conveying path.

In the developing section 32, a tank 16 is divided into several compartments by a plurality of partition boards 17. Each compartment is equipped with a rack which horizontally supports a plurality of roller pairs 18.

SUMMARY OF THE INVENTION

In the related art mentioned above, a number of roller pairs are disposed along the conveyor path. The distance between the pairs of rollers has to be decided based on the minimum size of the photo-sensitive material to be conveyed. Therefore, in light of this fact, a certain number of roller pairs have to be disposed along the conveyer path. In particular, when the distributing conveyer system is employed, each of the plural conveying paths has to be equipped with a number of roller pairs respectively. Adding to the disposition of pairs of rollers, a number of guide members for guiding the photo-sensitive material should also be disposed therein. Therefore, there is a problem in that the photo-processing apparatus increases in cost due to the number of pairs of rollers and guide members that are required. In addition, there is a possibility of scratching the photo-sensitive material when a number of pairs of rollers and guide members are disposed along the conveying path.

An object of the present invention is to provide a photo-processing apparatus which can reduce the cost of the apparatus compared with the conventional systems.

Another object of the present invention is to provide a photo-processing apparatus with a conveying path which is not likely to scratch the photo-sensitive material.

A characteristic structure of the present invention designed to solve the problem described above will now be described. In this invention a photo-processing apparatus for executing a predetermined treatment of a photo-sensing material by conveying it along a conveying path through two processing sections, for example, an exposing section and a developing section is provided. The apparatus includes a nipper means for nipping the photo-sensitive material and a first driving means for conveying the nipper means with a nipped photo-sensitive material along the conveying path.

This enables the photo-sensitive material to be conveyed by nipping the photo-sensitive material with the nipper means and conveying the nipper means along the conveying path. For example, when a pair of rollers is employed as a nipper means, the photo-sensing material is nipped by the pair of rollers and the pair of rollers is conveyed. Therefore, there is no need to dispose a number of pairs of rollers along the conveying path as was previously done. This provides a photo processing apparatus which results in a cost savings over previous systems.

Further, when a second driving means which moves the nipper means traversely at approximately right angles to the conveying path is additionally installed, the distributing conveyance can also be achieved. This means that the distributing conveyance can be achieved without disposing a number of pairs of rollers.

Furthermore, regarding the conveying path between the exposing section and the developing section of the photo-processing apparatus, it is particularly preferable to install the nipper means of the present invention. As is obvious from FIG. 12 described above, the conveying path from the exposing section 30 to the developing section 32 is rather long so that there are a certain amount of pairs of rollers that have to be disposed between these sections. Therefore, by disposing the nipper means driven to be conveyed in this portion, an efficient cost reduction can be achieved.

Further, when the photo-sensitive material is conveyed by the nipper means, it is particularly preferable to install an inverting mechanism for inverting the photo-sensitive material.

The reason why the conveying path from the exposing section 30 to the developing section 32 is rather long in the related art shown in FIG. 12 is to prevent the photo-sensitive material from turning with its emulsion surface inside in the developing section 32. In the tank 16, the photo-sensitive material is conveyed so that its emulsion surface faces a group of rollers with a smaller diameter in order to avoid quality deterioration of the image.

The present invention employs an inverting mechanism for inverting the photo-sensitive material, so that there is no need to elongate the conveying path in order to prevent the photo-sensitive material from turning with its emulsion surface kept inside as was previously done. This results in an effect that the space for the conveying path can be significantly reduced.

As an aspect of the nipper means, a pair of rollers may be used to nip the photo-sensitive material. Each roller of the pair of rollers may be rotationally driven by a drive unit installed to convey the photo-sensitive material in the exposing section.

This enables the pair of rollers to nip the conveyed photo-sensitive material by rotationally driving the pair of rollers. In the exposing section, the photo-sensitive material is conveyed out by the drive unit when the exposing and printing treatment is finished. The pair of rollers can also be rotationally driven by the same drive unit so that the pair of rollers need not be equipped with their own drive unit. This modification also results in a cost savings.

Further, it is preferable that the pair of rollers is constructed so as to be rotatable as one unit around a predetermined axis for predetermined angle so that the photo-sensitive material can be inverted by rotating the pair of rollers together with the nipped photo-sensitive material. This allows the photo-sensitive material to be inverted only by the rotating motion of the pair of rollers, that is only by use of a simple device.

Furthermore, it is preferable that the pair of rollers is constructed to nip the photo-sensitive material at a first point on the conveying path and to be rotated when the pair of rollers is conveyed a predetermined distance from the first point along the conveying path.

This allows the pair of rollers to nip the photo-sensitive material at the first point on the conveying path and to maintain its figure. The pair of rollers with the nipped photo-sensitive material is conveyed and then is rotated at a second point other than the first point to invert the photo-sensitive material.

In addition, when a guide member for guiding the photo-sensitive material from the exposing section to the nipper means is installed, the photo-sensitive material can be nipped more securely by the nipper means.

Furthermore, it is preferable that a pair of nipper means is installed at right angles to the direction of the conveying path. Even if there is only one nipper means, it can be adapted not only for normal conveying but also for distributing conveyance. In order to execute the distributing conveyance effectively, however, it is preferable that a pair of nipper means is installed. In the case of treating photo-sensitive materials with different widths, a pair of nipper means may be controlled synchronously to convey the photo-sensitive material with a wider width. One of the pair of nipper means may be controlled so as to be actuated for conveying that with a narrower width or a pair of nipper means may be controlled to be actuated with some timing delay within the pair respectively for the narrower one.

Other characteristic features of the present invention will become obvious by the description of the embodiments below with reference to the drawings.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which:

FIGS. 4*a* and 4*b* are operational diagrams illustrating the operation of the nip-conveying unit;

DETAILED DESCRIPTION OF THE PREFERRED EMBODIMENTS

Figure 12:
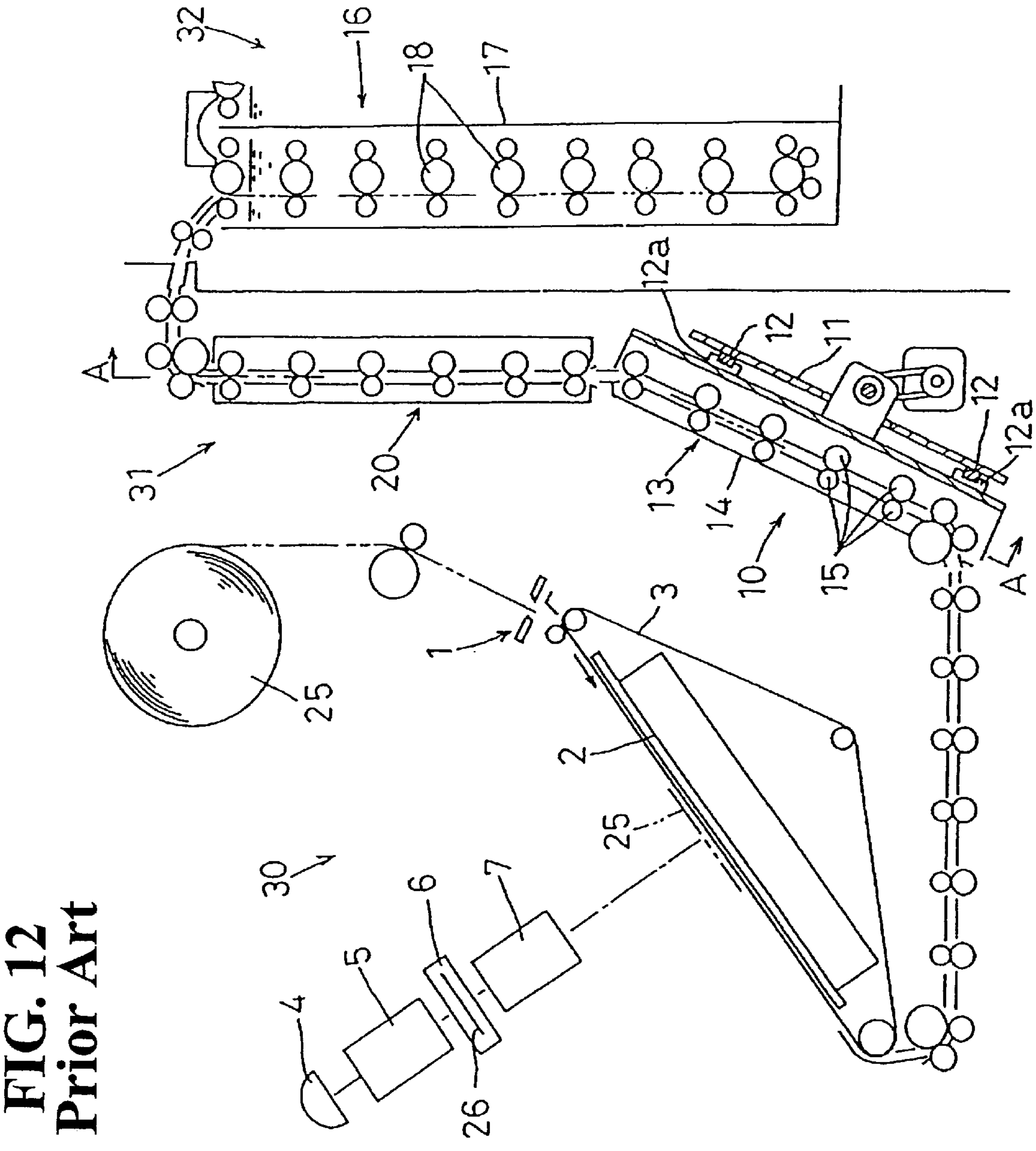
FIG. 12 Prior Art
FIG. 12 is a cross sectional view of the conveying device of the related art using a conveyor distributor unit.
Figure 13:
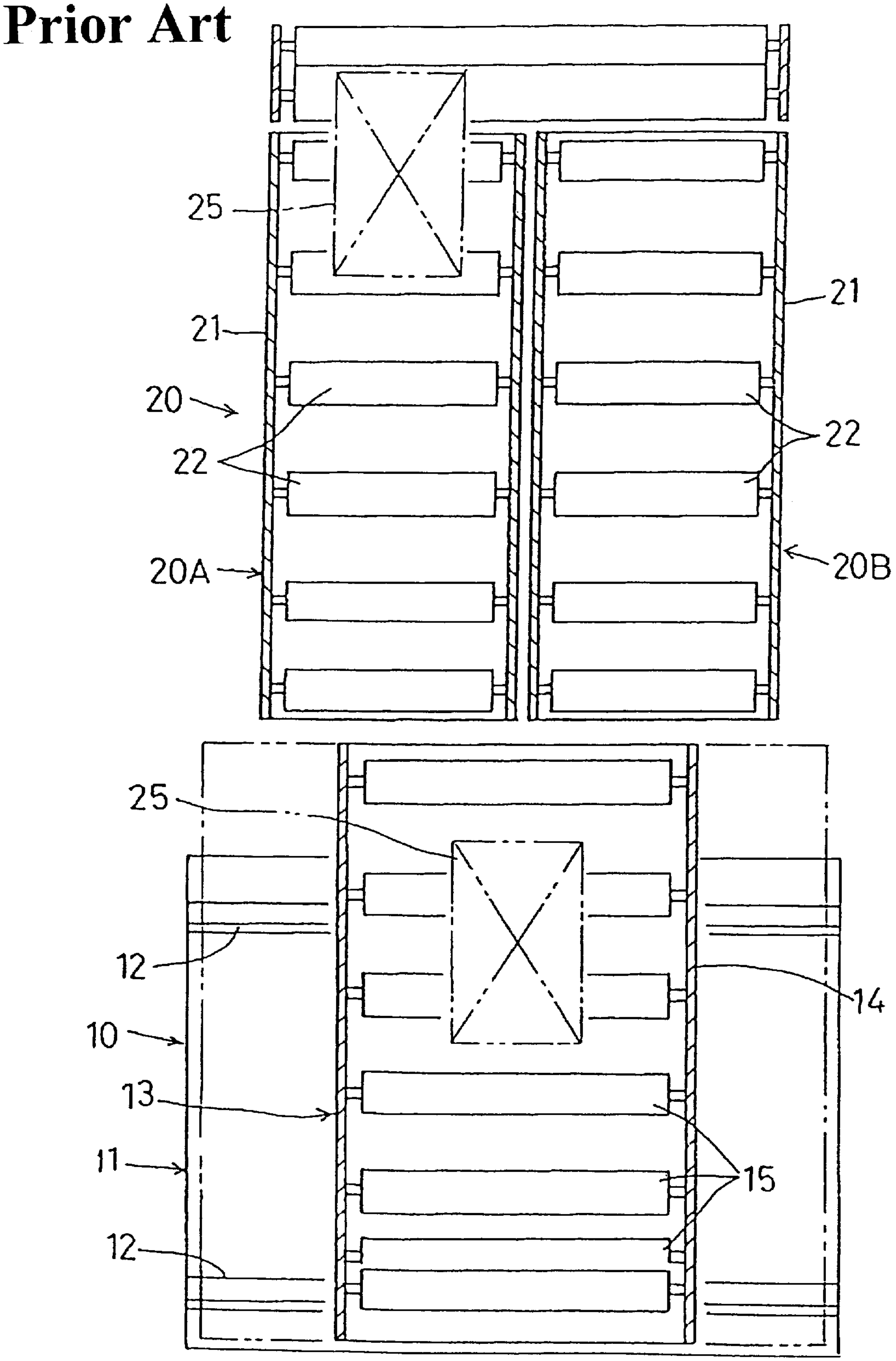
FIG. 13 Prior Art
FIG. 13 is a plan view of the conveying device of FIG. 12 taken along line A—A including distributing conveyance.

The preferred embodiments of the present invention will now be described with reference to the attached drawings. FIGS. 1–4 show a first embodiment of the present invention. In these drawings, a exposing section 30 and a conveying device 31 are shown in detail. The basic construction of the exposing section 30 is similar to that in FIG. 12 and the detailed description will be omitted and the same reference numerals and symbols are used as those in FIGS. 12 and 13. On each vertex of a triangle formed by an adsorptive belt 3 are disposed roller pairs 34, 35 and 36 respectively. A photo-sensitive material 25 is conveyed from the left side to the right side as shown by an arrow B in FIG. 1. The pair of rollers 34 on the downstream side of the exposing section 30 comprise a press roller 34*a* and a drive roller 34*b*. On the downstream side, a nip-conveying unit 37 (nipping and conveying means) is installed.

Figure 1:
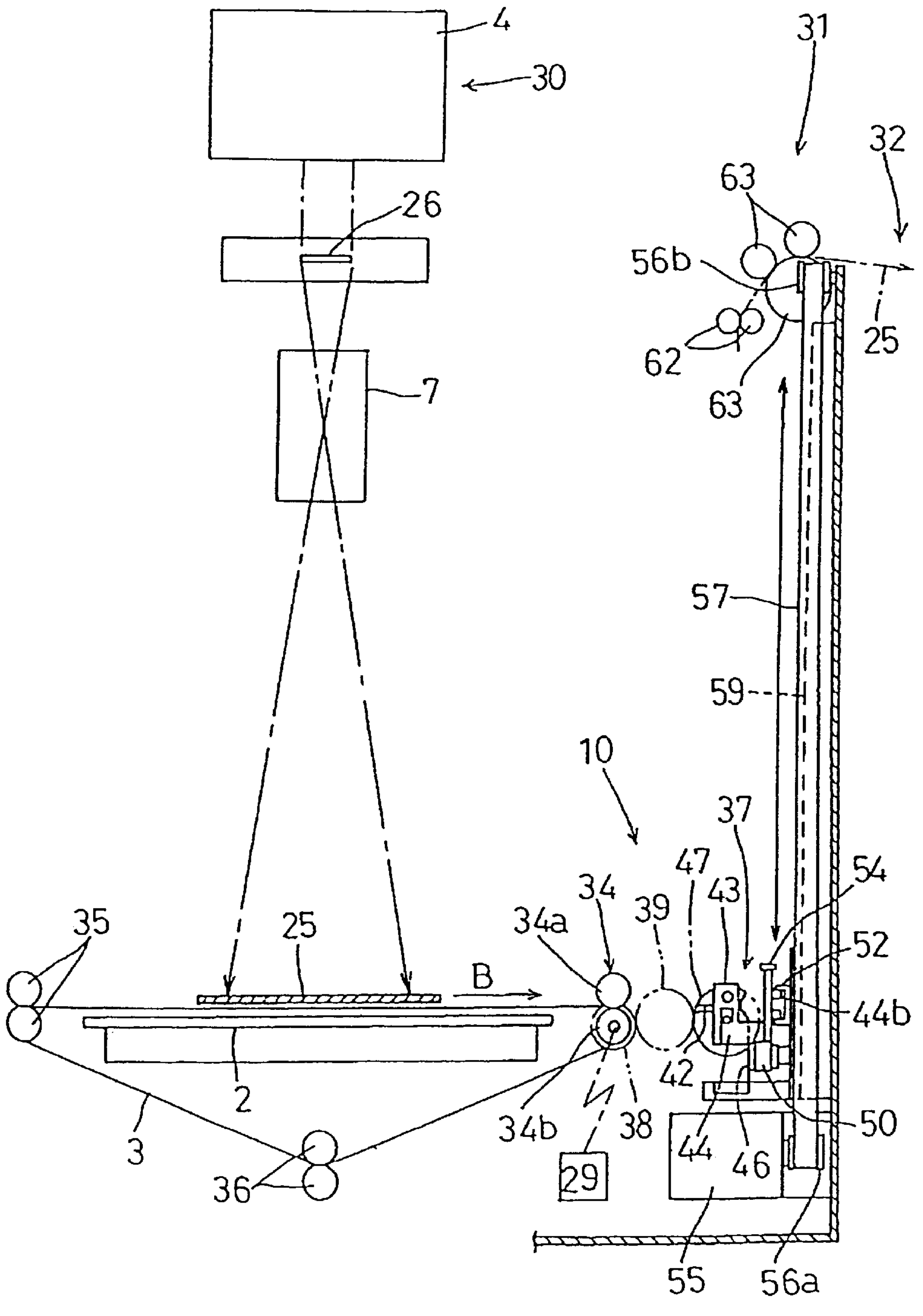
FIG. 1 is a cross sectional view of a photographic processing apparatus having an exposing section and a conveying device according to a first embodiment of the present invention.

The nip-conveying unit 37 comprises a pair of rollers composed of a lower holding roller 40 and an upper holding roller 41 for nipping the photo-sensitive material 25; a guide member 42 for guiding the photo-sensitive material 25 to the pair of rollers 40, 41; a first roller holding table 43 for mounting the pair of rollers 40, 41 which are rotatable and fixed to the guide member 42; a second roller holding table 44 for holding the first roller holding table 43 rotatable around the same axis as that of the lower holding roller 40; a torsional coil spring 45 for adding a torsional force to the first roller holding table 43 in the clockwise direction in FIG. 1; a leaf spring 46 for restricting rotation of the first roller holding table 43 in the clockwise direction; and a gear 47 installed so as to have a common axis with the lower holding roller 40. The leaf spring 46 is fixed to a table plate 61. The pair of holding rollers 40, 41 function as a nipper means for nipping the photo-sensitive material 25. The drive roller 34*b* is driven by a drive motor 29 which acts as a driving power source. At the same time, the driving force is transmitted to the lower holding roller 40 through a first gear 38 which is disposed so as to have a common axis with the drive roller 34*b*, a second gear 39 and the gear 47. The gear 47 and the lower holding roller 40 are engaged with each other through a one way clutch (not shown).

To add to that the following elements are also provided, a slide motor 48 for sliding the pair of holding rollers 40, 41 in a direction at right angles to the conveying path of the photo-sensitive material 25 (the lateral direction in FIG. 1); a drive sprocket 49*a* attached to a motor shaft of the slide motor 48; a driven sprocket 49*b*; and an endless belt 50 circulating between the sprockets 49*a* and 49*b*. This drive mechanism is installed on a motor table board 51. As simply shown in FIG. 4, the endless belt 50 is engaged with a lower portion 44*a* of the second roller holding table 44, so that the pair of holding rollers 40, 41 which is supported on the second roller holding table 44 through the first roller holding table 43 can be driven in the sliding direction mentioned above. Further, in order to make this slide-driving smooth, a guide portion 44*b* attached on the second roller holding table 44 is engaged with a slide rail 52 attached on the motor table board 51. On the motor table board 51 is also installed a first sensor 53 composed of a light emitter 53*a* and a light receiver 53*b*. Corresponding to this sensor, a detecting board 54 is attached on the upper part of the guide portion 44*b* of the second roller holding table 44. The slide motor 48, the sprockets 49*a*, 49*b* and the endless belt 50 function as a second drive means for moving the nipper means at right angles to the conveying path.

Figure 2:
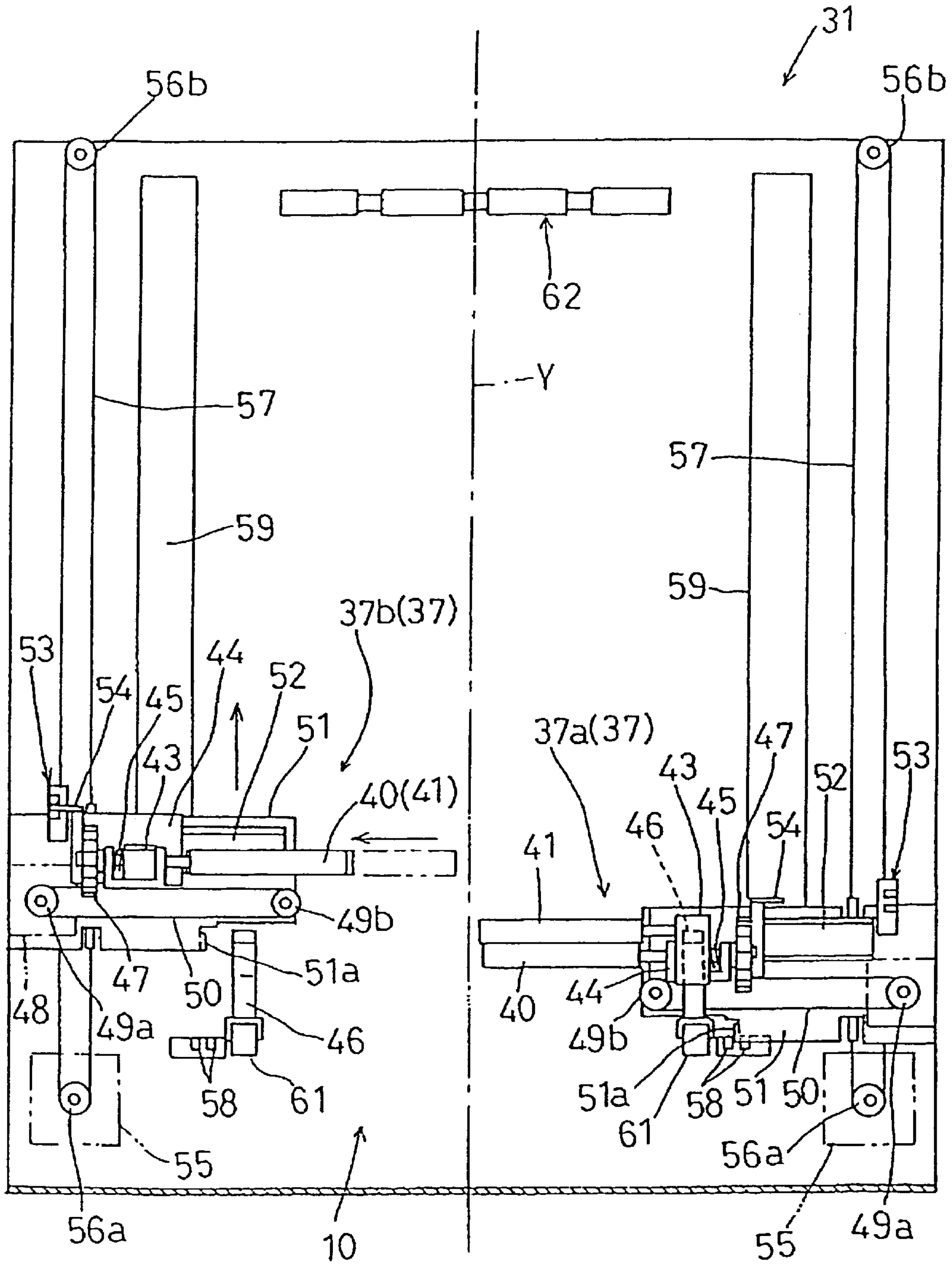
FIG. 2 is an elevational view of the conveying device according to the present invention.

The nip-conveying unit 37 is driven upward from the position shown in FIG. 2 by a lift motor 55 fixed on the conveying path, a driving sprocket 56*a* mounted on a motor shaft of the lift motor 55, a driven sprocket 56*b*, and an endless belt 57 circulating between the sprockets 56*a*, 56*b*. This allows the photo-sensitive material 25 to be guided from the exposing section 30 to the developing section 32. Thus, the nip-conveying unit 37 has a raised position and a lowered position.

In order to detect the lowered position, a second sensor 58 is installed and corresponding to that a bent portion 51*a* is formed on the motor table board 51. A slide rail 59 is installed parallel to the endless belt 57 to guide the nip-conveying unit 37 along the lifting direction. The lift motor 55, the sprockets 56*a*, 56*b* and the endless belt 57 function as a first drive means for conveying the nipper means with the photo-sensitive material along the conveying path.

Figure 3:
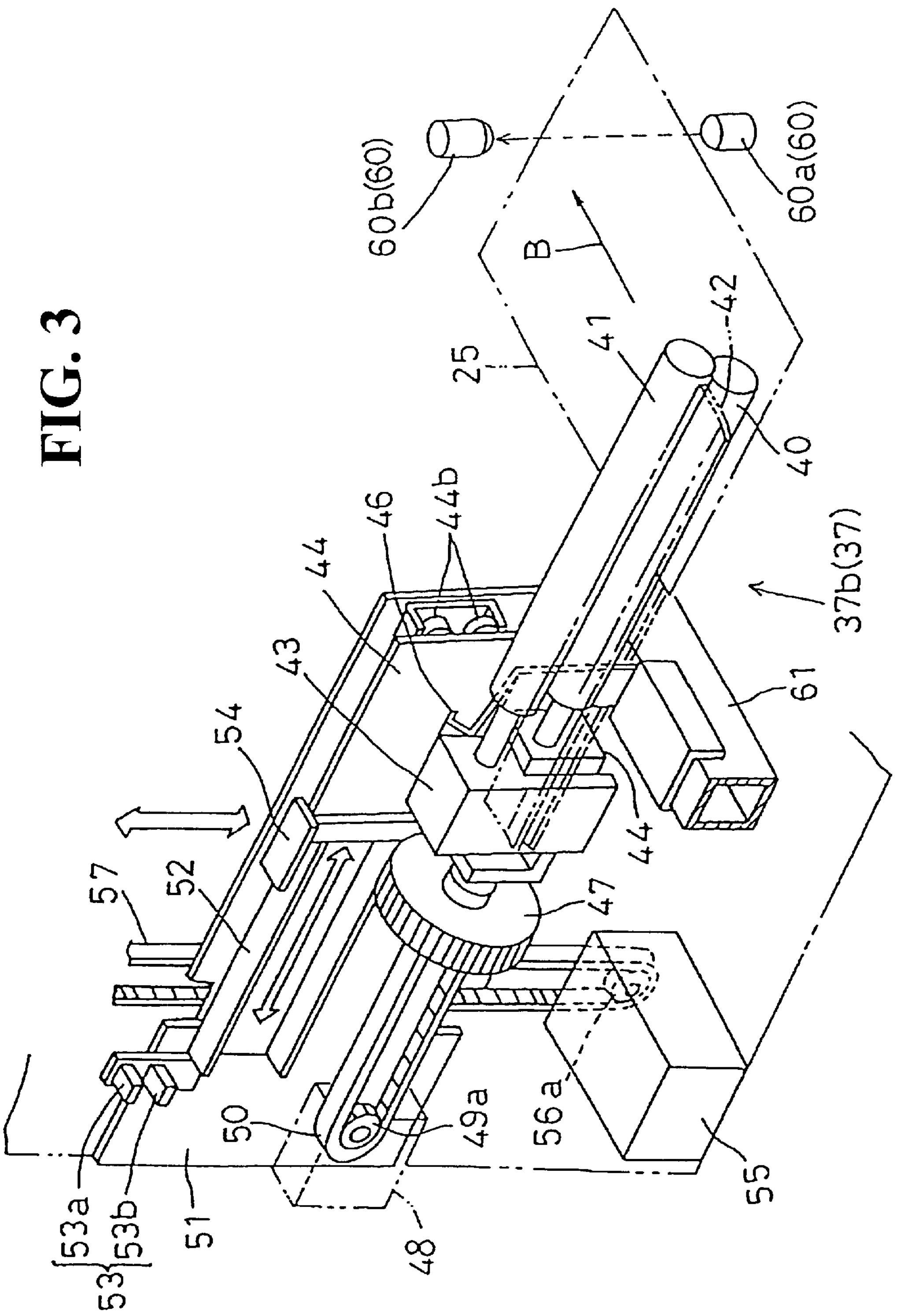
FIG. 3 is a perspective view of the nip-conveying unit according to the present invention.

As shown in FIG. 3, in order to detect a tip of the photo-sensitive material 25 conveyed into the nip-conveying unit 37, a third sensor 60, composed of a light emitter 60*a* and a light receiver 60*b* is installed.

In FIG. 2, the conveying device 31 is provided with a pair of nip-conveying units 37 arranged symmetrically with respect to a center line Y of the conveying path. The nip-conveying unit disposed on the right side is 37*a* and that on the left side is 37*b*. In the upper portion of the conveying device 31 is installed a pair of rollers 62 for receiving the photo-sensitive material 25 conveyed by the nip-conveying unit 37 (37*a*, 37*b*) and a pair of rollers 63 for guiding the photo-sensitive material into the developing section 32.

Figure 10:
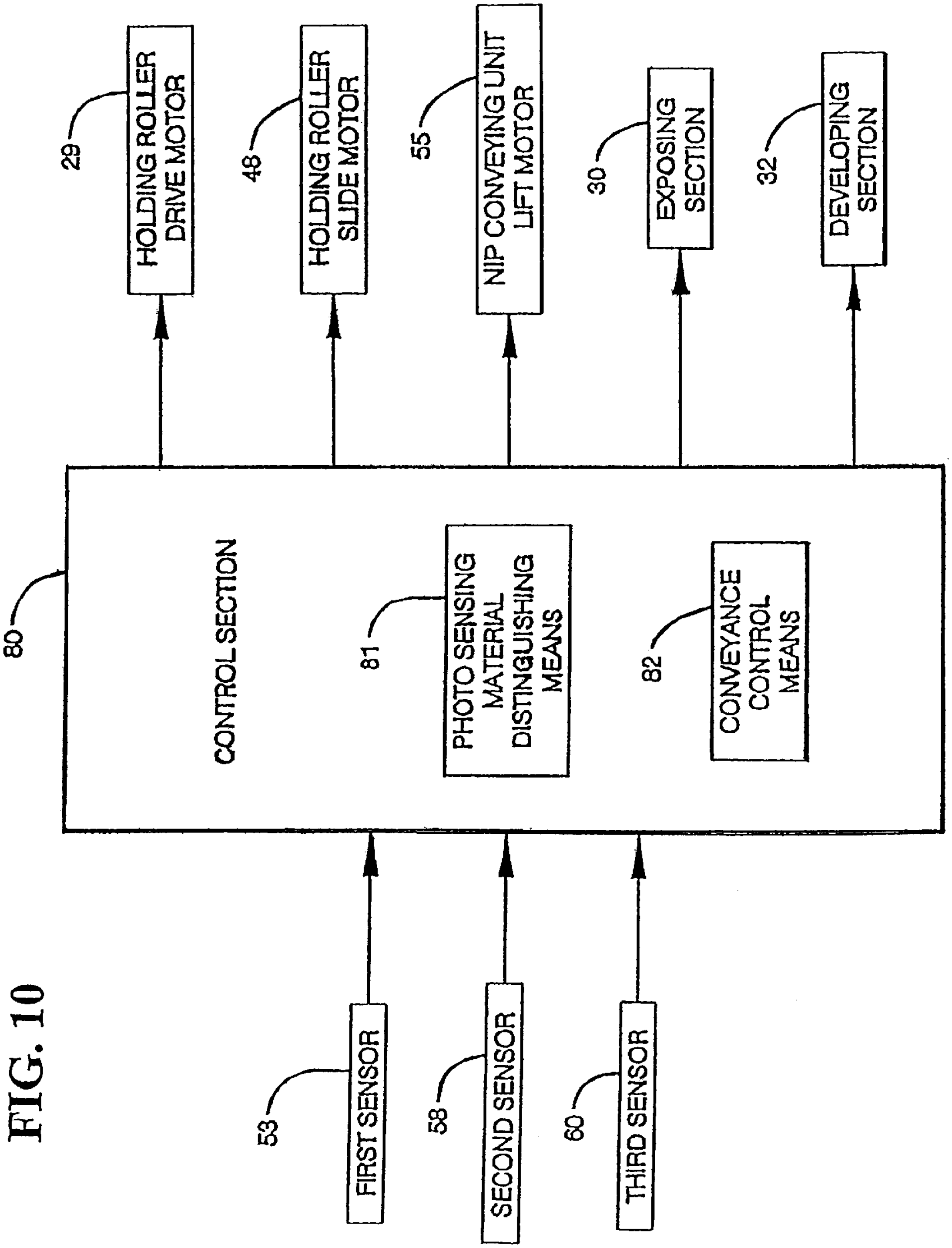
FIG. 10 is a control diagram according to the present invention.

FIG. 10 is a control block diagram for this apparatus. Each section of the photo-processing apparatus is controlled by a control section 80 having a microcomputer at its core. Photo-sensing material distinguishing means 81 judges whether the conveyed photo-sensitive material 25 is of a wider width or of a narrower width. For example, the width can be judged. by placing several sensors at right angles to the conveying path. A conveyance control means 82 controls the driving conditions of the drive motor 29, the slide motor 48 and the lift motor 55 based on an output signal from the first sensor 51, the second sensor 58 and the third sensor 60 and a judgment from the photo-sensitive material distinguishing means 81. In addition, the control section 80 also controls an operation of the exposing section 30 and the developing section 32.

Figure 5A:
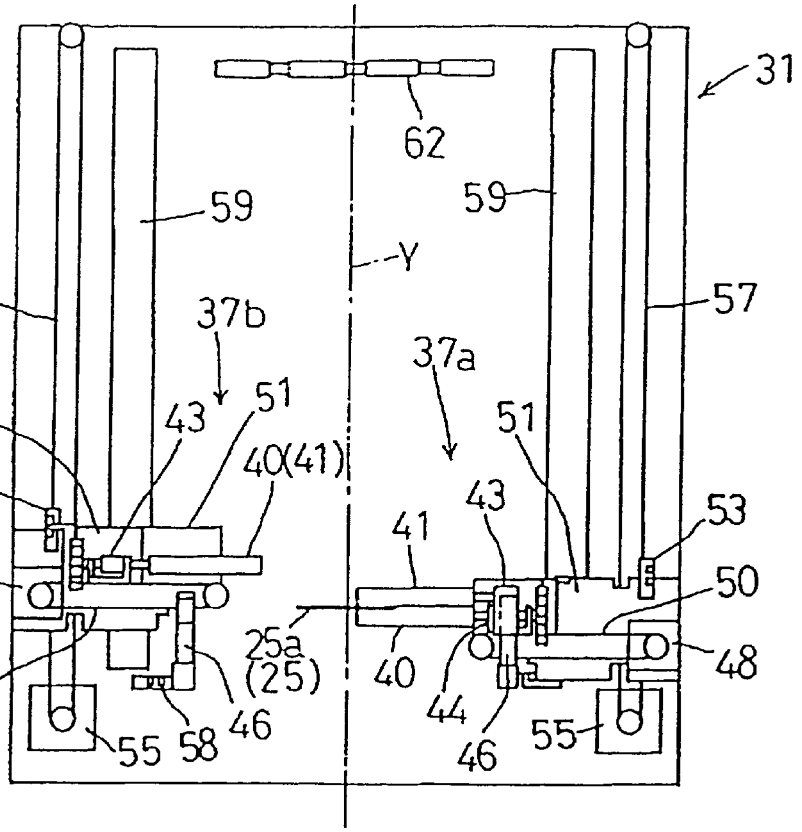
FIGS. 5*a* and 5*b* are first operational diagrams of the conveying device with distributing conveyance according to the present invention.

The operation of the conveying device 31 will now be described. The first case to be described is where the photo-sensitive material 25 with a narrower width (hereafter represented by 25*a*) is distributed while being conveyed. FIG. 5*a* shows an initial condition where the nip-conveying units 37*a*, 37*b* are waiting for the photo-sensitive material 25*a* to be sent out from the exposing section 30. As for the right and the left units, the right unit 37*a* stands by on the lowermost position with its holding rollers 40, 41 slid out near the center line Y, and the left unit 37*b* stands slightly raised position compared to the right unit 37*a* with its holding rollers 40, 41 slid into the left side of the drawing. As shown in FIG. 4*a*, when the photo-sensitive material 25*a* is conveyed after the exposing treatment is finished, it is guided by the guide member 42 and then conveyed by the pair of rollers 40, 41 in the B direction shown by the arrow in FIG. 3.

Figure 5B:
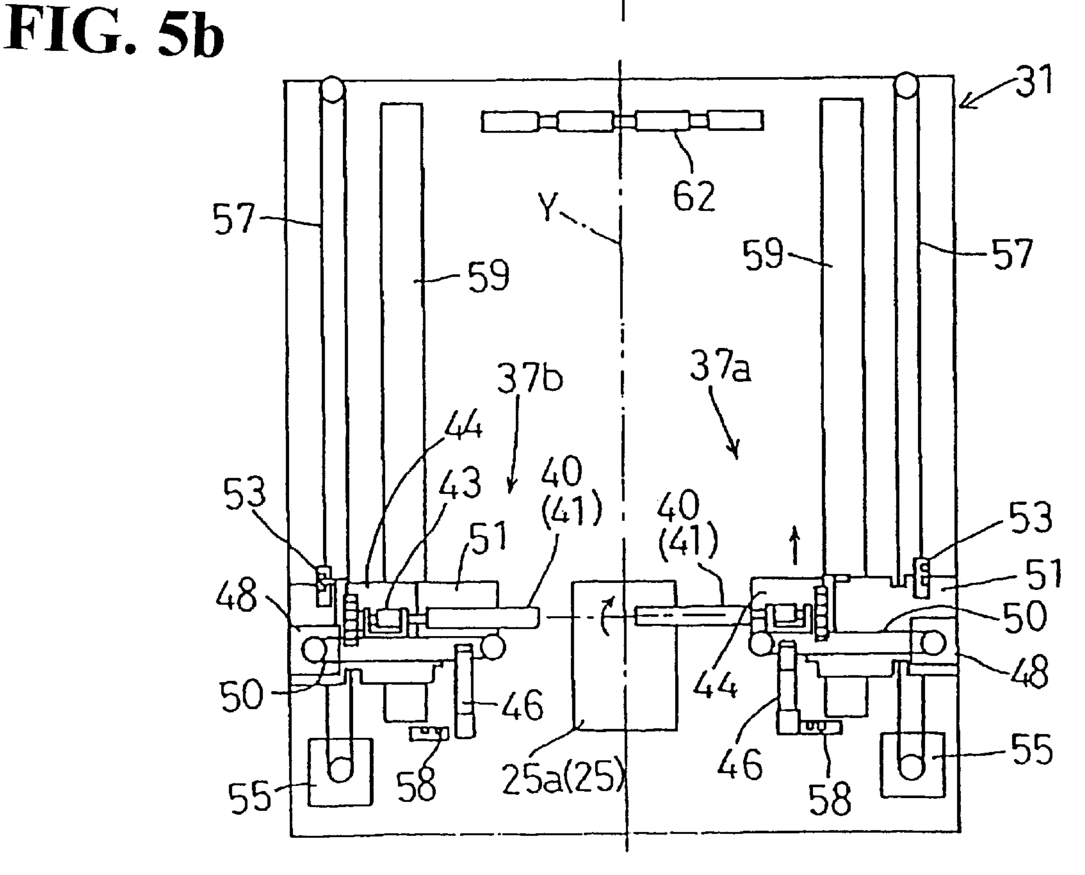

When the tip of the photo-sensitive material 25 is detected by the third sensor 60, the pair of rollers 40, 41 are stopped. Then, the lift motor 55 is actuated and the right unit 37*a* is raised. In the condition shown in FIG. 4*a* the first roller holding table 43 is forced to rotate clockwise, but its rotating movement is prevented by the leaf spring 46. When the right unit 37*a* is raised up to the position shown in FIG. 4*b*, however, it is released from the restriction of the leaf spring 46 and the first roller holding table 43 is rotated by 90 degrees clockwise with the torsional coil spring 45. According to this motion, the photo-sensitive material 25*a* changes its angle of orientation from horizontal to vertical. A front view in this condition is shown in FIG. 5*b*. By changing the angle of orientation, the surface with emulsion is moved from outside the conveying path to the inside thereof. This system is referred to as a switch back system because of the exchange of the front and back surfaces on the conveying path.

Figure 6A:
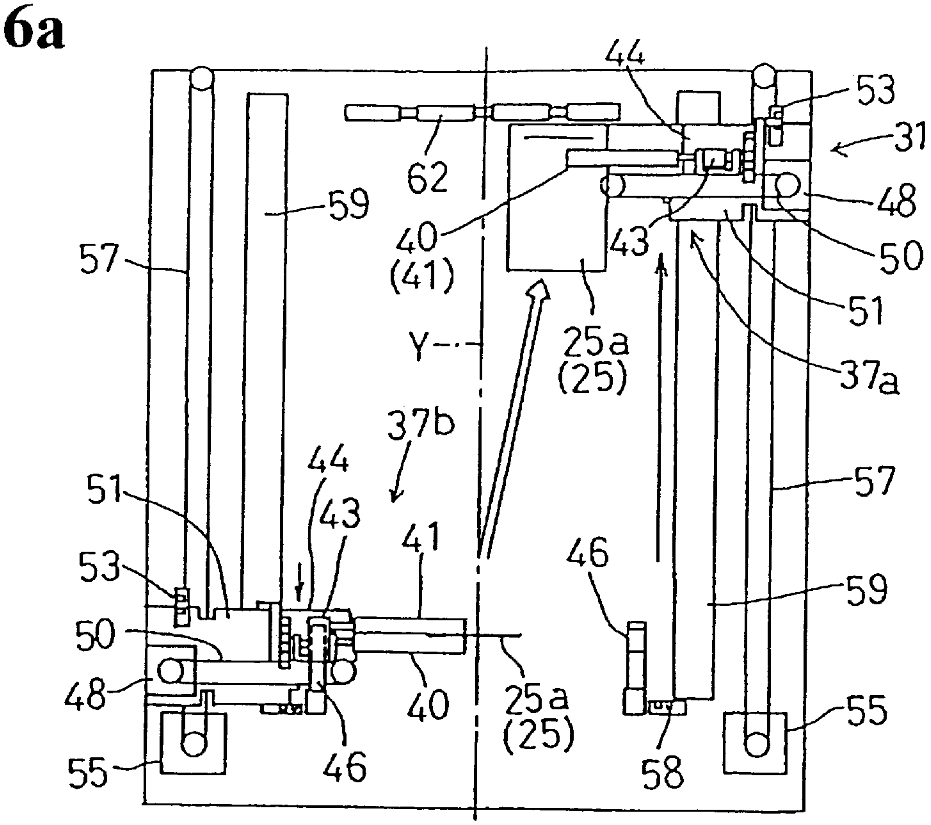
FIGS. 6*a* and 6*b* are second operational diagrams of the conveying device with distributing conveyance according to the present invention.

The right unit 37*a* is raised continuously and synchronously. The pair of holding rollers 40, 41 are slid to the right, i.e. receding direction from the center line Y, from the position shown in FIG. 5*b* to that in FIG. 6*a*. When the first sensor 53 detects the detecting board 54, the sliding motion is stopped. Thus, the photo-sensitive material is distributed while being conveyed.

Figure 6B:
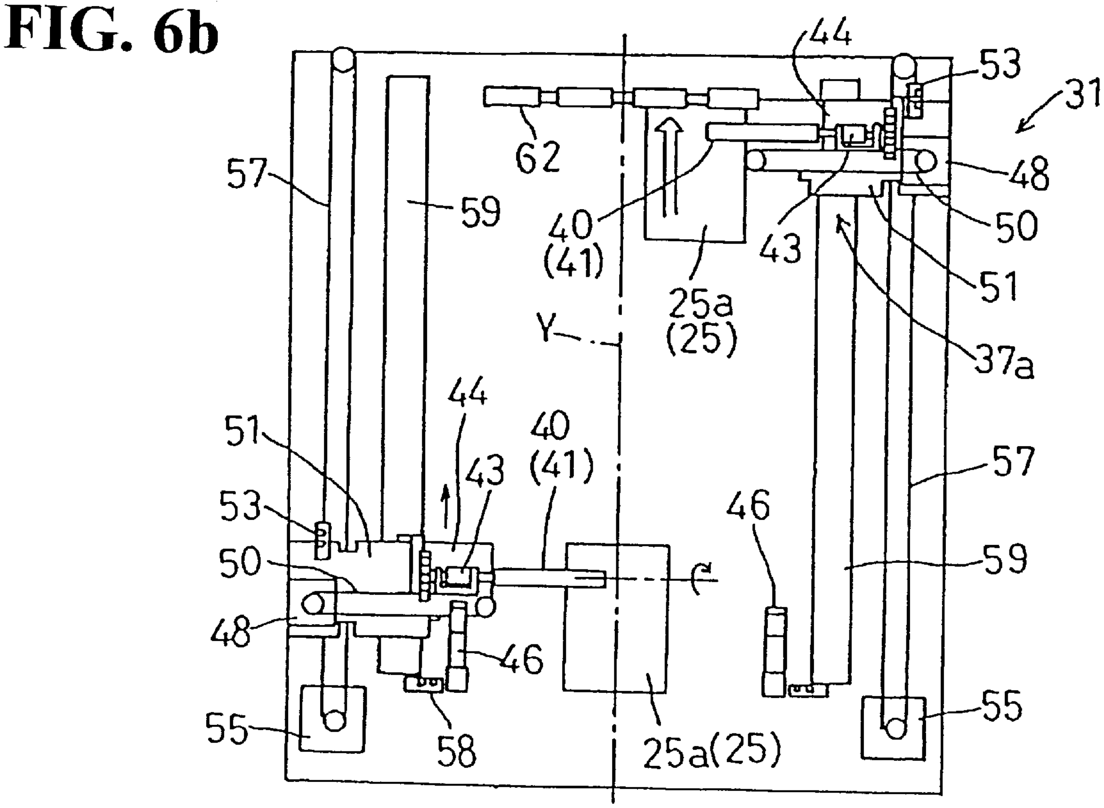

When the right unit 37*a* is raised up to the predetermined position, the right unit 37*a* is detected by a sensor (not shown) and is stopped. In this condition, the tip of the photo-sensitive material is delivered to the pair of rollers 62. At the same time as this motion, the left unit 37*b* receives the next photo-sensitive material 25*a* and takes a position shown in FIG. 6*b*. When the left unit 37*b* receives the photo-sensitive material 25*a*, it is lowered to the lowest position and the pair of rollers 40, 41 being slid to the right on the drawing by the motor 48.

Figure 7A:
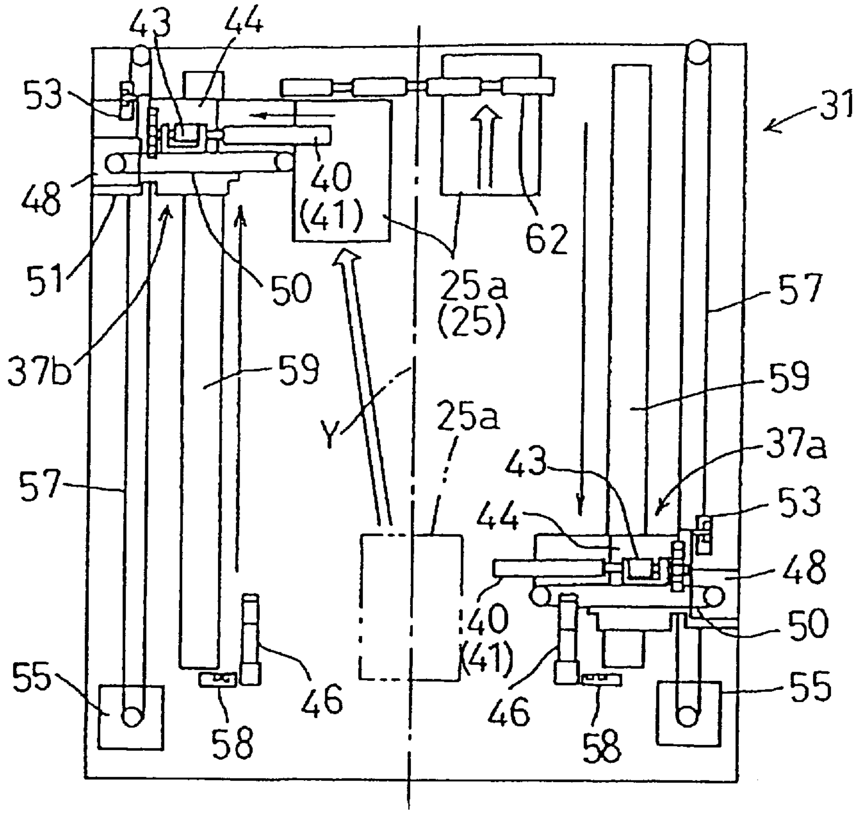
FIGS. 7*a* and 7*b* are third operational diagrams of the conveying device with distributing conveyance according to the present invention.

Then, as shown in FIG. 7*a*, the right unit 37*a* is lowered with the pair of rollers 40, 41 slid to the right. The lowering motion is controlled so as to stop when the second sensor 58 detects the bent portion 51*a* of the motor table board 51. At the same time, the left unit 37*b* distributes and conveys the photo-sensitive material 25*a*. As shown in FIG. 7*a*, there is a phase gap in the conveying time schedule between the right photo-sensitive material 25*a* received by the pair of rollers 62 and the left photo-sensitive material. Therefore, they are conveyed in turn. Thus, the photo-sensitive material 25*a* conveyed in the exposing section on a single line is distributed between two lines on the conveying device 31.

The reason why the nip-conveying unit 37*a* is lowered with the pair of holding rollers 40, 41 slid to the right is to prevent it from touching the photo-sensitive material 25*a* which is nipped and conveyed by the left unit 37*b*. Although the nip-conveying unit 37 returns to its initial position while the photo-sensitive material 25*a* is nipped by the pair of rollers 62, no problem occurs because the pair of holding rollers 40, 41 is released (disengaged from the drive motor) while the unit 37 is raised. The unit 37 (37*a*, 37*b*) returns to the initial condition when a side portion 43*a* of the first roller holding table 43 is brought into contact with a tip 46*a* of the leaf spring 46 as shown in FIG. 4*b* and the table 43 is rotated counterclockwise against a force generated by the coil spring 45 as shown in FIG. 4*a*.

Figure 7B:
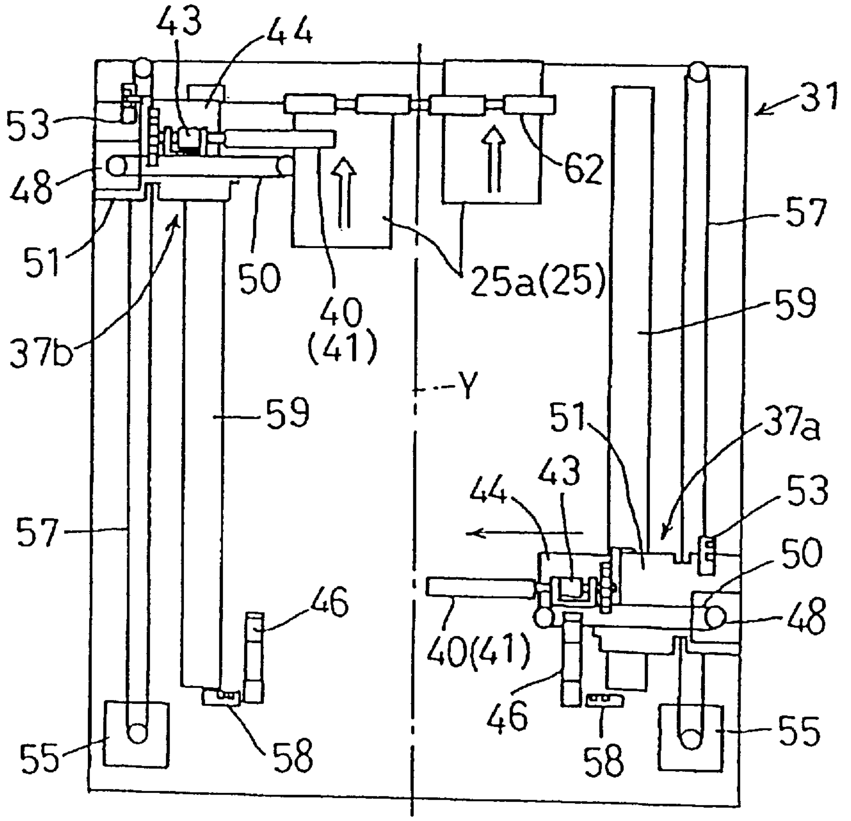

The slide motor 48 is driven to slide the pair of rollers 40, 41 to the left on the drawing, i.e. toward the center line Y of the conveying path, while the right unit 37*a* is lowered as shown in FIG. 7*b*. Then the left unit 37*b* is lowered and returns to its initial position as shown in FIG. 5*a* to wait for the next photo-sensitive material 25*a*.

The operation of the conveying device 31 while conveying the photo-sensitive material 25 with a wider width (hereafter represented by 25*b*) will now be described.

Figure 8A:
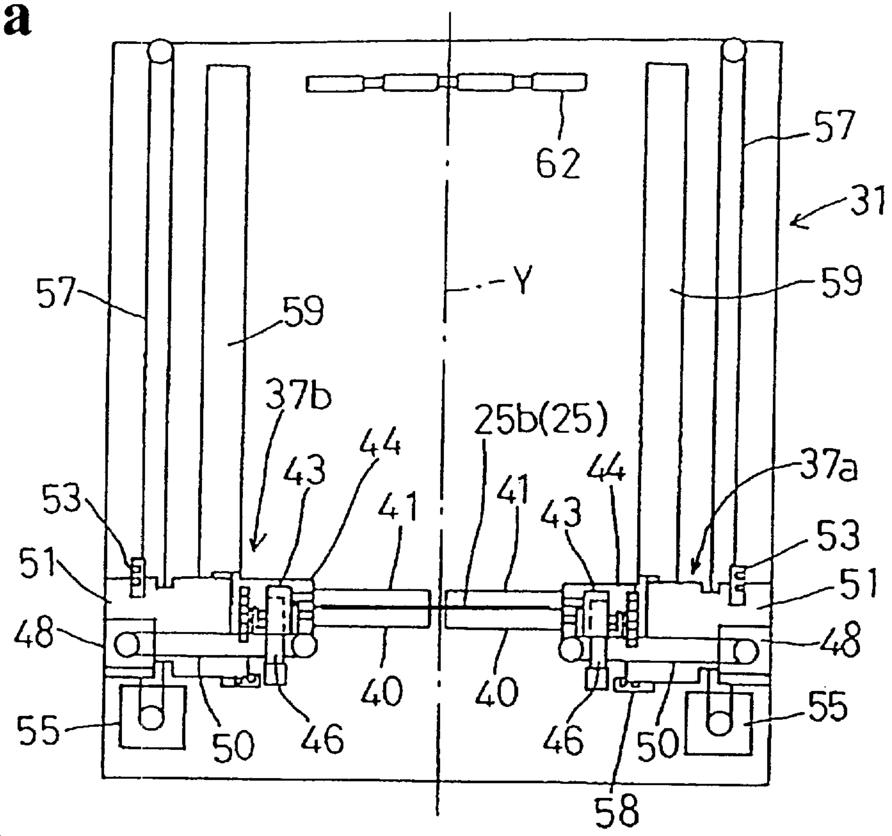
FIGS. 8*a* and 8*b* are fourth operational diagrams of the conveying device without distributing conveyance according to the present invention.
Figure 8B:
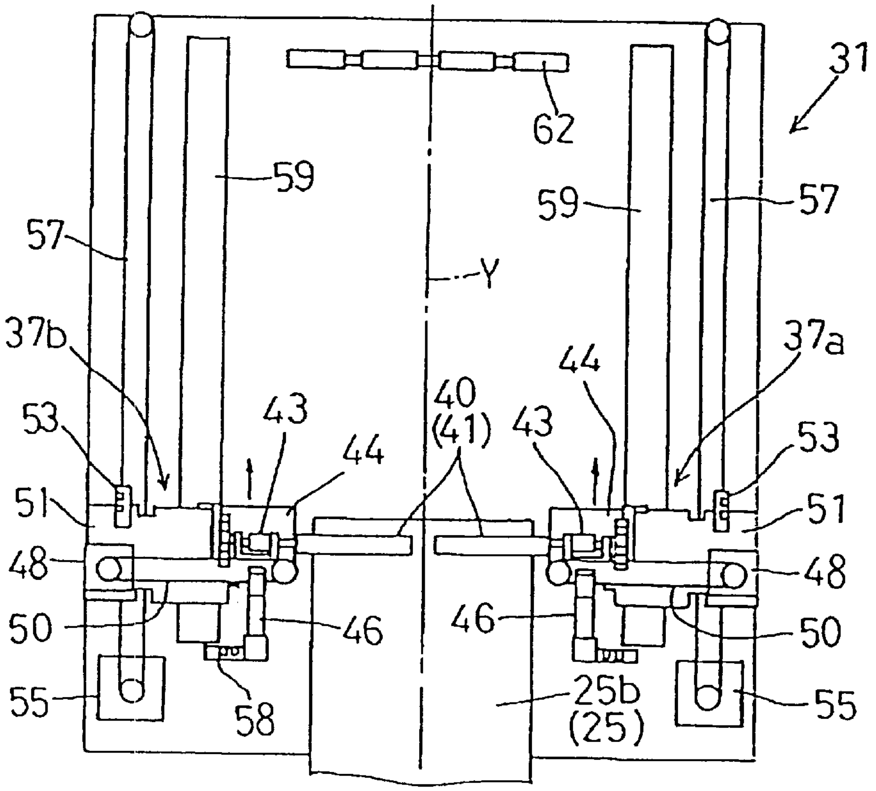
Figure 9A:
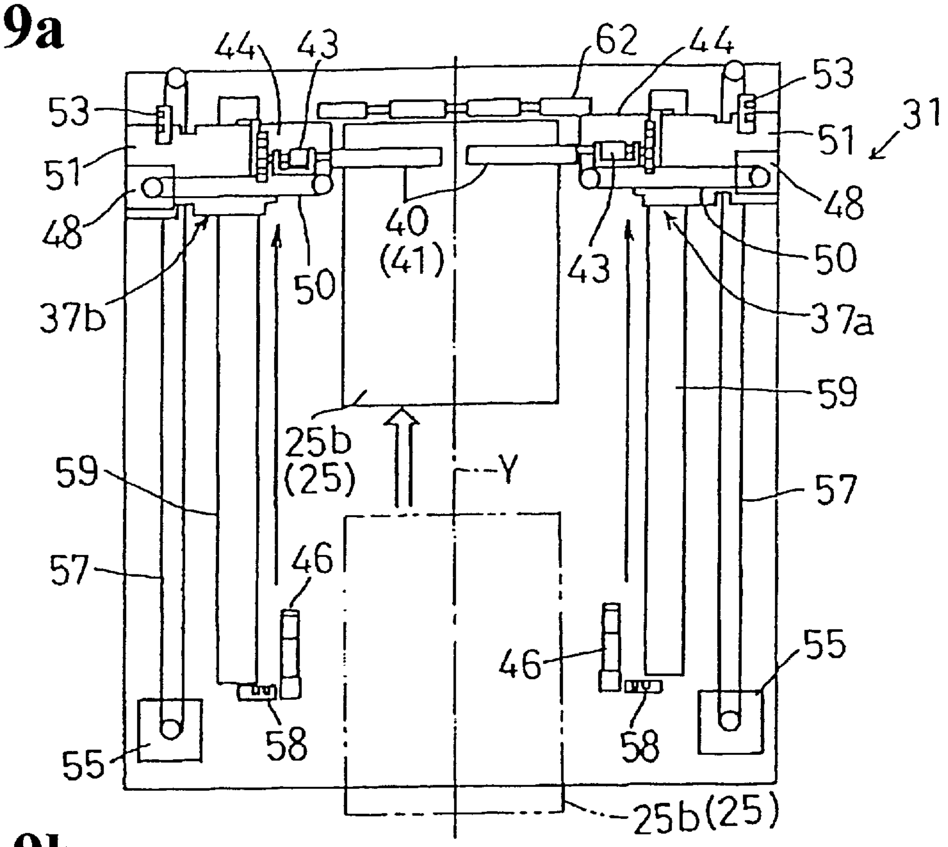
FIGS. 9*a* and 9*b* are fifth operational diagrams of the conveying device without distributing conveyance according to the present invention.
Figure 9B:
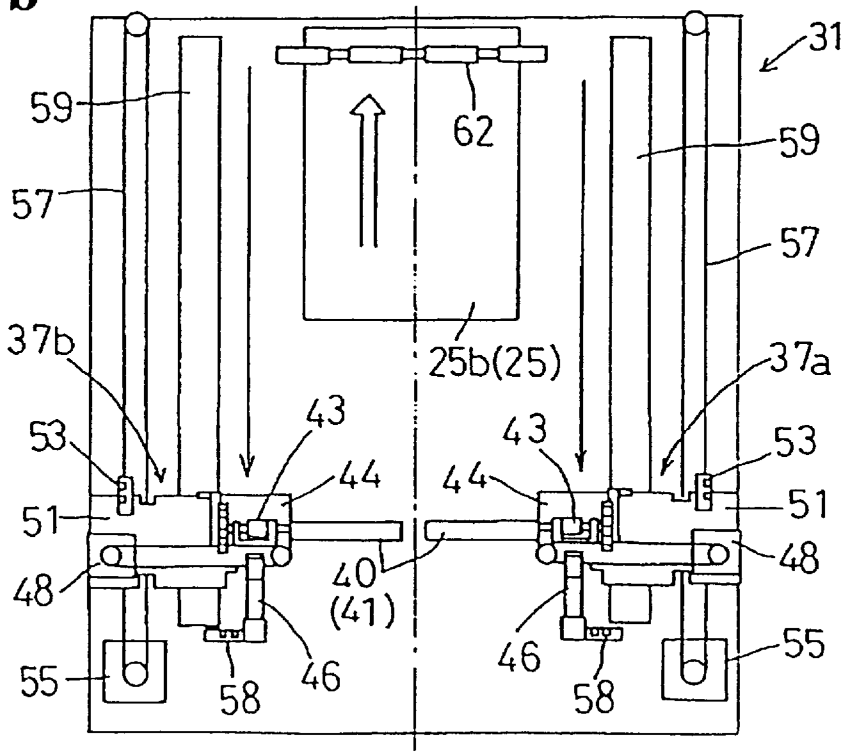

FIG. 8*a* shows an initial condition where both of the right and the left units 37*a*, 37*b* stand by at their lowest position. The photo-sensitive material 25*b* is nipped on both sides by the right and the left holding rollers 40, 41. FIG. 8*b* shows the condition when the switch back motion is completed and then the right and the left lift motors 55 are driven synchronously and both units 37*a*, 37*b* are raised as shown in FIG. 9*a*.

In the case of a wider width 25*b* of the photo-sensitive material, it is not distributed and conveyed along a single line. When the delivery of the photo-sensitive material 25*b* to the pair of rollers 62 is completed, both of the right and the left units 37*a*, 37*b* return to their initial positions.

Figure 11:
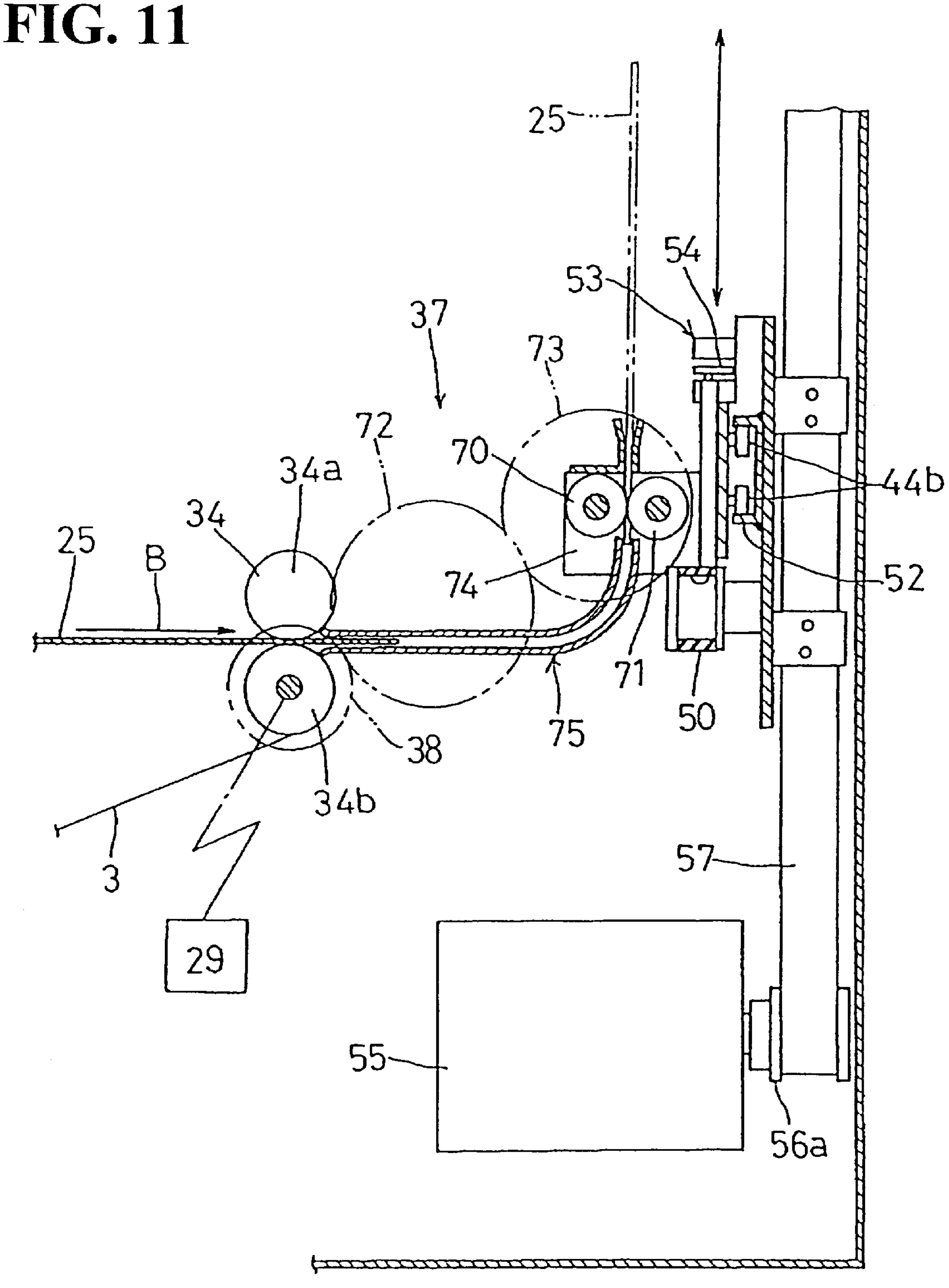
FIG. 11 shows a second embodiment of the conveying device according to the present invention.

A second embodiment of the conveying device 31 will now be described as shown in FIG. 11. The members and the portions having the same functions as that of the first embodiment use the same reference numerals and their detailed description has been omitted.

A left holding roller 70 and a right holding roller 71 are mounted so as to be rotatable on a roller holding table 74. A driving force from the drive motor 29 through gears 72, 73 is transmitted to the left holding roller. In order to guide the photo-sensitive material 25 which has been exposed and printed in the exposing section 30 from the pair of rollers 34 to the holding rollers 70, 71, a fixed guide 75 is installed. By this fixed guide 75, the photo-sensitive material 25 is nipped by the pair of holding rollers 70, 71 with its angle changed from a horizontal orientation to a vertical orientation.

Other embodiments of the present invention will now be described as follows.

(1) Although the nipper means is disposed between the exposing section 30 and the developing portion 32 in the present embodiments, it may be disposed on other conveying paths. For example, it can be applied to the developing section and the drying section.

(2) Although the coil spring is employed to rotate the pair of holding rollers 40, 41, its own motor may be installed for this purpose.

(3) The pair of rollers 40, 41 may be controlled to slide before or after being raised instead of during it.

(4) The stop position may be controlled by a pulse signal from the motor (pulse motor) 48, 55 without using the first sensor 53 and the second sensor 58 (and the upper position detecting sensor even though not shown).

(5) As for the photo-sensitive material distinguishing means, the width of the photo-sensitive material 25 may be detected by the kind of paper magazine in which the photo-sensitive material 25 is stored.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photo-processing apparatus for providing a predetermined treatment of a photo-sensitive material by conveying the photo-sensitive material along a conveying path through at least two processing sections, said photo-processing apparatus comprising a nip-conveying device for nipping the photo-sensitive material and conveying the photo-sensitive material along the conveying path, wherein said nip-conveying device comprises at least one pair of rollers for nipping the photo-sensitive material and a first drive means for conveying said at least one pair of rollers with the nipped photo-sensitive material along the conveying path in a first direction, said at least one pair of rollers each having a respective longitudinal axis; and further comprising a second drive means for moving said at least one pair of rollers to a second position by moving said at least one pair of rollers in a direction parallel to their respective longitudinal axis.

2. A photo-processing apparatus as claimed in claim 1, wherein said second drive means for moving said at least one pair of rollers to a second position moves said at least one pair of rollers at approximately right angles to the direction of the conveying path.

3. A photo-processing apparatus as claimed in claim 2, wherein the at least two processing sections are an exposing section and a developing section and said at least one pair of rollers is provided along the conveying path between said exposing section and said developing section.

4. A photo-processing apparatus as claimed in claim 1, wherein the at least two processing sections are an exposing section and a developing section and said at least one pair of rollers is provided along the conveying path between said exposing section and said developing section.

5. A photo-processing apparatus as claimed in claim 3, further comprising an inversion mechanism for inverting the photo-sensitive material while the photo-sensitive material is held by said at least one pair of rollers.

6. A photo-processing apparatus as claimed in claim 4, further comprising an inversion mechanism for inverting the photo-sensitive material while the photo-sensitive material is held by said at least one pair of rollers.

7. A photo-processing apparatus as claimed in claim 3, wherein said at least one pair of rollers is constructed and arranged so as to nip the photo-sensitive material using a pair of rollers and each roller of said pair of rollers is driven by a driving power source for conveying the photo-sensitive material in said exposing section.

8. A photo-processing apparatus as claimed in claim 4, wherein said at least one pair of rollers is constructed and arranged so as to nip the photo-sensitive material using a pair of rollers and each roller of said pair of rollers is driven by a driving power source for conveying the photo-sensitive material in said exposing section.

9. A photo-processing apparatus as claimed in claim 7, wherein said pair of rollers is constructed and arranged so as to be rotatable around a predetermined axis and the photo-sensitive material is inverted by rotating said pair of rollers with the photo-sensitive material nipped through a predetermined angle.

10. A photo-processing apparatus as claimed in claim 8, wherein said pair of rollers is constructed and arranged so as to be rotatable around a predetermined axis and the photo-sensitive material is inverted by rotating said pair of rollers with the photo-sensitive material nipped through a predetermined angle.

11. A photo-processing apparatus as claimed in claim 9, wherein said pair of rollers nips the photo-sensitive material at a first point on the conveying path and rotates at a second point after being conveyed for a predetermined distance from the first point on the conveying path.

12. A photo-processing apparatus as claimed in claim 10, wherein said pair of rollers nips the photo-sensitive material at a first point on the conveying path and rotates at a second point after being conveyed for a predetermined distance from the first point on the conveying path.

13. A photo-processing apparatus as claimed in claim 3, further comprising a guide member for guiding the photo-sensitive material from said exposing section to said at least one pair of rollers.

14. A photo-processing apparatus as claimed in claim 4, further comprising a guide member for guiding the photo-sensitive material from said exposing section to said at least one pair of rollers.

15. A photo-processing apparatus as claimed in claim 1, wherein said at least one pair of rollers comprises two pairs of rollers disposed at right angles to the conveying path.

16. A photo-processing apparatus as claimed in claim 3, wherein said at least one pair of rollers comprises two pairs of rollers disposed at right angles to the conveying path.

17. A photo-processing apparatus as claimed in claim 4, wherein said at least one pair of rollers comprises two pairs of rollers disposed at right angles to the conveying path.

18. A photo-processing apparatus for providing a predetermined treatment of a photo-sensitive material by conveying the photo-sensitive material along a conveying path through at least two processing sections, said photo-processing apparatus comprising a nip-conveying device for nipping the photo-sensitive material and conveying the photo-sensitive material along the conveying path, wherein said nip-conveying device comprises at least one pair of rollers for nipping the photo-sensitive material and a first drive means for conveying said at least one pair of rollers with the nipped photo-sensitive material along the conveying path in a first direction, said at least one pair of rollers each having a respective longitudinal axis; and further comprising a second drive means for moving said at least one pair of rollers to a second position by rotating said at least one pair of rollers around an axis parallel to each of the respective longitudinal axes.

19. A photo-processing apparatus for providing a predetermined treatment of a photo-sensitive material by conveying the photo-sensitive material along a conveying path through at least two processing sections, said photo-processing apparatus comprising a nip-conveying device for nipping the photo-sensitive material and conveying the photo-sensitive material along the conveying path, wherein said nip-conveying device comprises first and second pairs of rollers for nipping photo-sensitive material, a first drive mechanism for conveying said first pair of rollers with a nipped photo-sensitive material along the conveying path in a first direction and a second drive mechanism for conveying said second pair of rollers with another nipped photo-sensitive material along the conveying path in a second direction and wherein said first drive mechanism and said second drive mechanism alternate operation.

20. A photo-processing apparatus for providing a predetermined treatment of a photo-sensitive material by conveying the photo-sensitive material along a conveying path through at least two processing sections, said photo-processing apparatus comprising a nip-conveying device for nipping the photo-sensitive material and conveying the photo-sensitive material along the conveying path, wherein said nip-conveying device comprises first and second pairs of rollers for nipping the photo-sensitive material, a first drive mechanism for conveying said first pair of rollers with the nipped photo-sensitive material along the conveying path and a second drive mechanism for conveying said second pair of rollers with the nipped photo-sensitive material along the conveying path and wherein said first drive mechanism and said second drive mechanism operate simultaneously to move the nipped photo-sensitive material together along the conveying path.

* * * * *